(12) United States Patent
Hsu et al.

(10) Patent No.: US 11,442,575 B2
(45) Date of Patent: Sep. 13, 2022

(54) TOUCH DISPLAY DRIVING APPARATUS AND OPERATION METHOD THEREOF

(71) Applicant: Novatek Microelectronics Corp., Hsinchu (TW)

(72) Inventors: Yi-Chia Hsu, Hsinchu County (TW); Hsiang-Cheng Yu, Hsinchu County (TW); Chin-Lin Lee, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 2 days.

(21) Appl. No.: 17/008,680

(22) Filed: Sep. 1, 2020

(65) Prior Publication Data

US 2021/0064214 A1    Mar. 4, 2021

Related U.S. Application Data

(60) Provisional application No. 62/894,840, filed on Sep. 1, 2019.

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/044* (2013.01)

(58) Field of Classification Search
CPC ............... G06F 3/0412; G06F 3/04166; G06F 3/041661; G06F 3/044; G06F 3/0446
See application file for complete search history.

(56) References Cited

U.S. PATENT DOCUMENTS

| | | | |
|---|---|---|---|
| 9,946,384 B2 | 4/2018 | Yun et al. | |
| 10,928,881 B2 | 2/2021 | Syed et al. | |
| 2012/0068964 A1 | 3/2012 | Wright et al. | |
| 2014/0136867 A1* | 5/2014 | Yamamoto | G06F 1/3262 713/320 |

(Continued)

FOREIGN PATENT DOCUMENTS

| | | |
|---|---|---|
| CN | 101561730 | 10/2009 |
| CN | 101702106 | 5/2010 |

(Continued)

OTHER PUBLICATIONS

"Office Action of Taiwan Counterpart Application", dated Mar. 12, 2021, p. 1-p. 7.

*Primary Examiner* — Robin J Mishler
(74) *Attorney, Agent, or Firm* — JCIPRNET

(57) ABSTRACT

The disclosure provides a touch display driving apparatus and an operation method thereof. The touch display driving apparatus is configured to drive a touch display panel. The touch display driving apparatus includes a touch sensing circuit configured to output a touch driving signal to a touch sensor array of the touch display panel, and receive touch sensing signals from the touch sensor array. The touch driving signal is configured to scan the touch sensor array at a normal scan rate in a normal touch scanning mode, and scan, in response to a touch event which is determined as occurring in a doze mode, the touch sensor array at a first scan rate in a fast touch scanning mode immediately preceding to the normal touch scanning mode, wherein the first scan rate is greater than the normal scan rate.

12 Claims, 15 Drawing Sheets

(56) References Cited

U.S. PATENT DOCUMENTS

| | | | | |
|---|---|---|---|---|
| 2015/0355774 A1* | 12/2015 | Johansson | ............... | G09G 3/20 |
| | | | | 345/173 |
| 2017/0003824 A1 | 1/2017 | Yun et al. | | |
| 2018/0088733 A1 | 3/2018 | Syed et al. | | |

FOREIGN PATENT DOCUMENTS

| | | |
|---|---|---|
| CN | 105739757 | 7/2016 |
| CN | 106325635 | 1/2017 |
| CN | 107870783 | 4/2018 |

\* cited by examiner

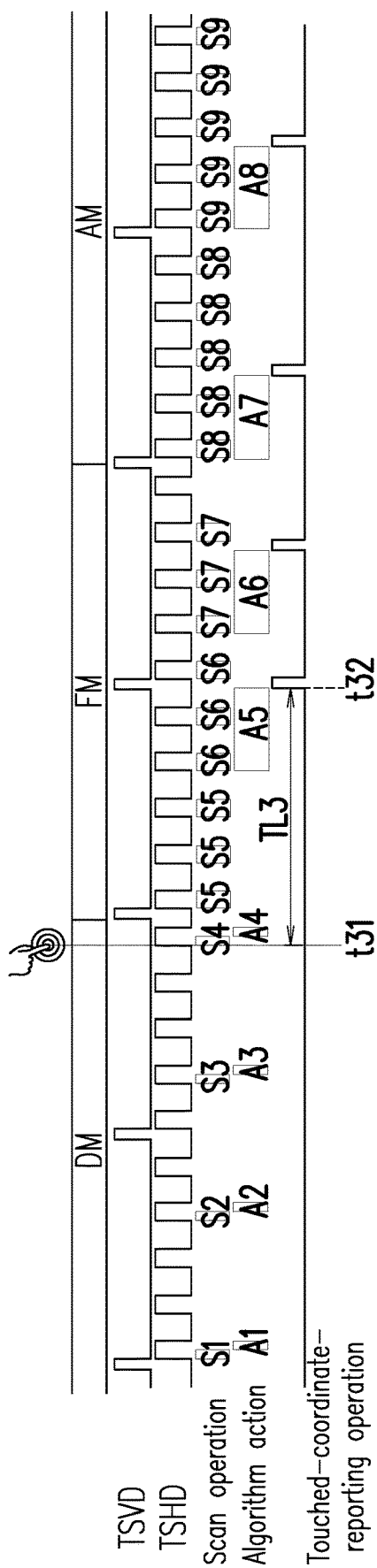
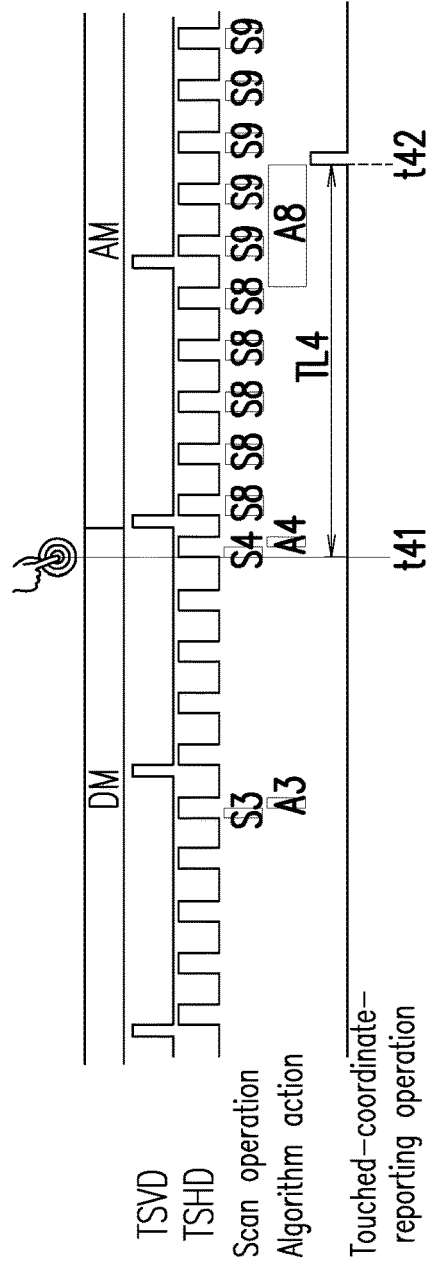
FIG. 3A
FIG. 3B

TOUCH DISPLAY DRIVING APPARATUS AND OPERATION METHOD THEREOF

CROSS-REFERENCE TO RELATED APPLICATION

This application claims the priority benefit of U.S. provisional application Ser. No. 62/894,840, filed on Sep. 1, 2019. The entirety of the above-mentioned patent application is hereby incorporated by reference herein and made a part of this specification.

BACKGROUND

Field of the Disclosure

The disclosure relates to an electronic device, and particularly relates to a touch display driving apparatus and an operation method thereof.

Description of Related Art

In electronic devices (such as mobile phones or tablet computers) with small and medium-sized touch display panels, the use of touch and display driver integrated (TDDI) single chip has been popular. In an in-cell touch display panel, the common electrodes provide a common voltage VCOM during a display driving period, and the potential difference between the common electrode and the pixel electrode is the pixel voltage. During a touch detection period or called a touch sensing period, a plurality of common electrodes are connected to be used as a touch electrode such that a touch sensor array consisting of a plurality of touch electrodes are formed.

Typically, the display refresh rate is fixed at 60 Hz. The touch control circuit in the conventional TDDI chip will be synchronized according to the signals TSVD and TSHD sent by the display driving circuit to achieve a touch sensing power saving mode (or referred to as doze mode) at 120 Hz and a touch operation mode (or referred to as normal touch scanning mode or active mode) at 120 Hz, thus achieving a touch report rate at 120 Hz. A touch sensing frame means fully scanning all of touch electrodes (which are active) once. As such, a touch report rate 120 Hz is that two touch sensing frames are completed in a display frame period, under the display refresh rate 60 Hz.

The length of time from the first touch event that occurs in the doze mode to the TDDI chip reports a touch coordinate of a touch event can be referred to as the first tap latency under the doze mode. The conventional TDDI chip can only obtain the touch coordinate in the normal touch scanning mode and report the touch coordinate to the application processor (AP) or the central processing unit (CPU). In response to that the first touch event occurs in the doze mode, the conventional TDDI chip will end the doze mode and enter the normal touch scanning mode to obtain the touch coordinate point of the touch event, and then report the touch coordinate to the AP (or CPU). Since the doze mode aims for power saving, the touch scan rate is limited in the doze mode, such that is little room for the conventional TDDI chip to reduce the first tap latency under the doze mode. The longer the first tap latency, the worse the user experience. How to shorten the first tap latency is one of the important technical issues.

It should be noted that the content of the section "Related Art" is used to help understand the present disclosure. Part of the content (or the entire content) disclosed in the section "Related Art" may not be the conventional technology known to those with ordinary knowledge in the technical field. The content disclosed in the section "Related Art" does not mean that the content has been known by those with ordinary knowledge in the technical field before the application of the present disclosure.

SUMMARY OF THE DISCLOSURE

The disclosure provides a touch display driving apparatus and an operation method thereof to shorten the first tap latency under the doze mode as much as possible.

In an embodiment of the disclosure, the touch display driving apparatus is configured to drive a touch display panel. The touch display driving apparatus includes a touch sensing circuit configured to output a touch driving signal to a touch sensor array of the touch display panel, and receive a plurality of touch sensing signals from the touch sensor array. The touch driving signal is configured to scan the touch sensor array at a normal scan rate in a normal touch scanning mode, and scan, in response to a touch event which is determined as occurring in a doze mode, the touch sensor array at a first scan rate in a fast touch scanning mode immediately preceding the normal touch scanning mode, wherein the first scan rate is greater than the normal scan rate.

In an embodiment of the disclosure, the operation method includes: outputting, by a touch sensing circuit, a touch driving signal to a touch sensor array of the touch display panel, wherein the touch driving signal is configured to scan the touch sensor array at a normal scan rate in a normal touch scanning mode, and scan, in response to a touch event which is determined as occurring in a doze mode, the touch sensor array at a first scan rate in a fast touch scanning mode immediately preceding the normal touch scanning mode, wherein the first scan rate is greater than the normal scan rate; and receiving, by the touch sensing circuit, a plurality of touch sensing signals from the touch sensor array.

Based on the above, the touch display driving apparatus and the operation method thereof described in the embodiments of the disclosure can configure the touch driving signal to scan the touch sensor array at the normal scan rate in the normal touch scanning mode. When a touch event occurs in the doze mode, the touch sensing circuit immediately ends the doze mode and enters the fast touch scanning mode. The touch sensing circuit configures the touch driving signal to scan the touch sensor array at a first scan rate (greater than the normal scan rate) in the fast touch scanning mode immediately preceding the normal touch scanning mode. By speeding up the touch scan rate in the fast touch scanning mode, the touch display driving apparatus can shorten the first tap latency under the doze mode as much as possible.

In order to make the above-mentioned features and advantages of the present disclosure more obvious and understandable, the embodiments are specifically described below in detail in conjunction with the accompanying drawings.

BRIEF DESCRIPTION OF THE DRAWINGS

FIG. 3A is a timing diagram of a touch sensing operation according to an embodiment of the disclosure.

FIG. 3B is a timing diagram of a touch sensing operation according to a related art.

FIG. 5 is a schematic diagram illustrating a touch sensor array of a touch display panel in a doze mode according to an embodiment.

DESCRIPTION OF EMBODIMENTS

Figure 1:
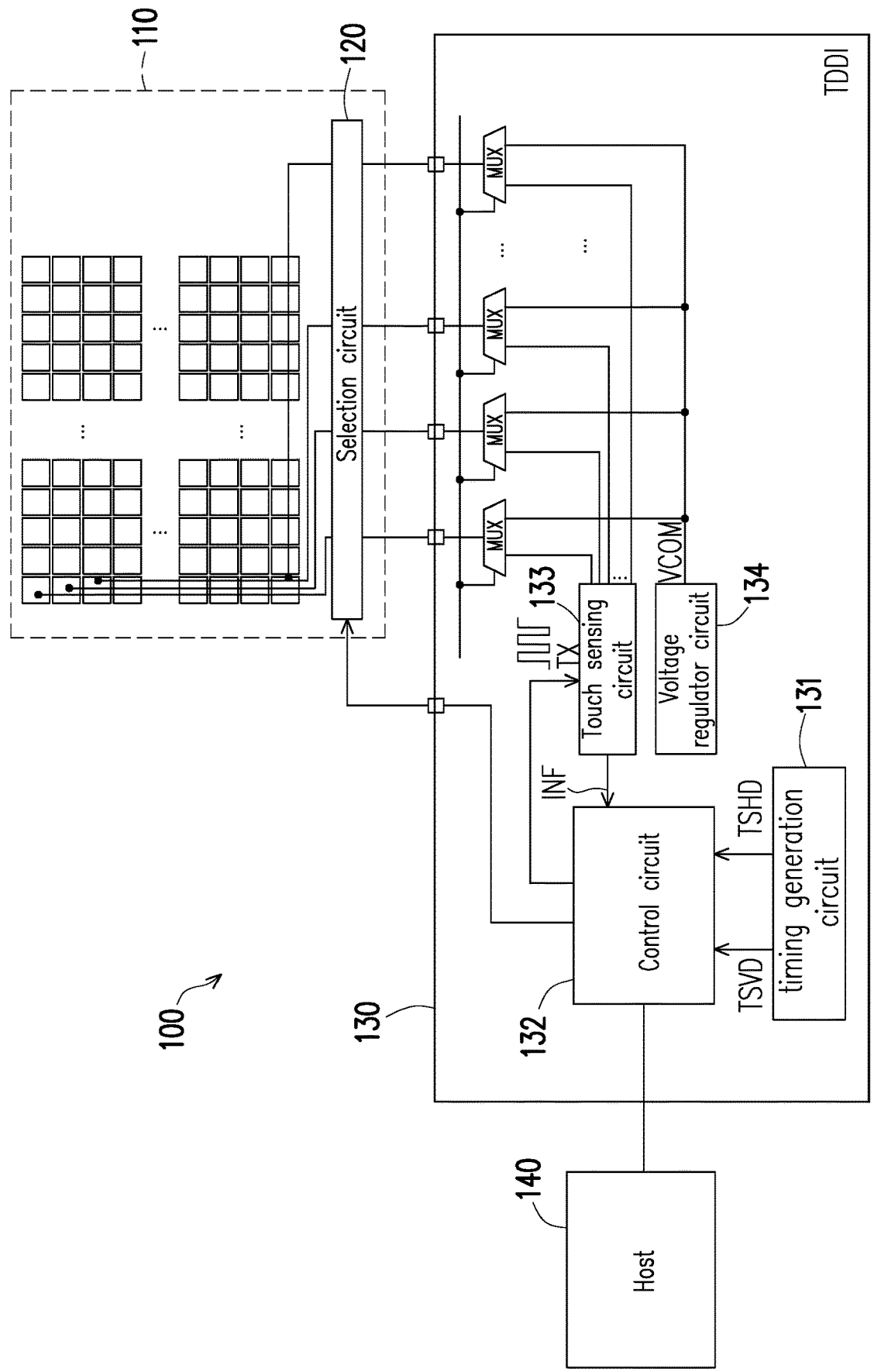
FIG. 1 is a schematic circuit block diagram of a display apparatus according to an embodiment of the disclosure.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Terms such as "first" and "second" mentioned in the specification or the claims are only for naming the elements or distinguishing different embodiments or scopes and are not intended to limit the upper limit or the lower limit of the number of the elements or to limit the order the elements. Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic circuit block diagram of a display apparatus 100 according to an embodiment of the disclosure. The display apparatus 100 shown in FIG. 1 includes a touch display panel 110, a selection circuit 120 and a touch display driving apparatus 130. The touch display driving apparatus 130 can drive the touch display panel 110. According to design requirements, the touch display panel 110 may be an in-cell touch display panel or other display panels with touch sensing functions. The touch display panel 110 has a plurality of common electrodes, and the common electrodes form a touch sensor array consisting of a plurality of touch electrode shown in FIG. 1. The number of the touch electrodes in the touch sensor array of the touch display panel 110 can be determined according to design requirements. For example, the touch sensor array shown in FIG. 1 may include 18*32 touch electrodes.

The selection circuit 120 is controlled by a control signal from the touch display driving apparatus 130. According to design requirements, the touch display driving apparatus 130 may include a touch and display driver integrated (TDDI) chip. During the display driving period, the touch display driving apparatus 130 can provide the common voltage VCOM to the common electrodes of the touch display panel 110 through the selection circuit 120, and the potential difference between the common electrode and the pixel electrode (not shown) is the pixel voltage. During the touch sensing period, the common electrodes of the touch display panel 110 can be connected by groups to form a touch sensor array consisting of touch electrodes (touch sensors).

In the embodiment shown in FIG. 1, the touch display driving apparatus 130 may include a timing generation circuit 131, a control circuit 132, a touch sensing circuit 133, and a voltage regulator circuit 134. During the display driving period, the voltage regulator circuit 134 can provide the common voltage VCOM to the selection circuit 120 through the multiplexer MUX. Based on the routing operation of the selection circuit 120, the common voltage VCOM output by the voltage regulator circuit 134 can be provided to all (or part) of the common electrodes of the touch display panel 110.

The timing generation circuit 131 can provide a touch sensing frame synchronization signal TSVD and a touch sensing period synchronization signal TSHD to the control circuit 132. The touch sensing frame synchronization signal TSVD is a periodic pulse signal and each pulse indicates a start time of a touch sensing frame. The touch sensing frame synchronization signal TSVD can be synchronized with a display frame synchronization signal Vsync (not shown) used in the display driving operation, and the touch sensing period synchronization signal TSHD can be synchronized with a horizontal synchronization signal Hsync (not shown) used in the display driving operation. The touch sensing period synchronization signal TSHD may be a periodic signal, and a period during which the touch sensing period synchronization signal TSHD is at the first logic level (for example, high logic level) is the touch sensing period, and a period during which the touch sensing period synchronization signal TSHD is at the second logic level (for example, the low logic level) is the display driving period. One touch sensing frame period includes N periods of TSHD, and in each touch sensing period, one or more columns of touch electrodes (touch sensors) of the touch display panel 110 can be detected.

Figure 2:
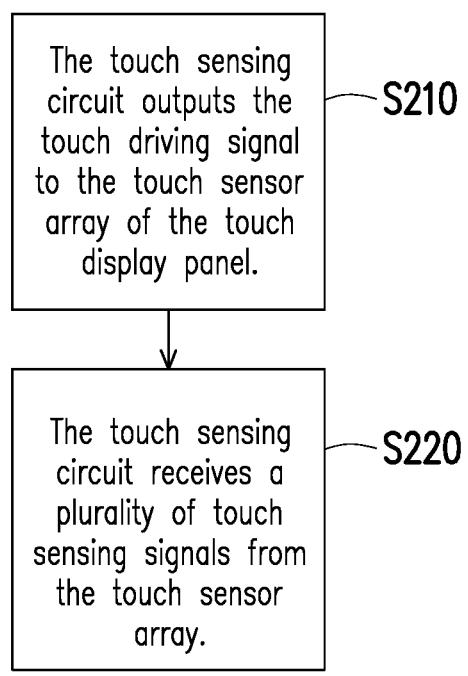
FIG. 2 is a schematic flowchart of an operation method of a touch display driving apparatus according to an embodiment of the disclosure.

FIG. 2 is a schematic flowchart of an operation method of a touch display driving apparatus according to an embodiment of the disclosure. Please refer to FIG. 1 and FIG. 2. The control circuit 132 is coupled to the timing generation circuit 131 to receive the touch sensing frame synchronization signal TSVD and the touch sensing period synchronization signal TSHD. The control circuit 132 can generate the touch driving signal TX to the touch sensing circuit 133. The touch driving signal TX is configured to scan the touch sensor array of the touch display panel 110 at different touch scanning modes, including a normal touch scanning mode, a doze mode, and a fast touch scanning mode. The touch driving signal TX includes a plurality of periodic pulses, which transit between two voltage levels which do not exceed the operating voltage range of analog front-end (AFE) circuits in the touch sensing circuit 133. During the touch sensing period, the touch sensing circuit 133 can output the touch driving signal TX to the selection circuit 120 through the multiplexer MUX (step S210). Based on the routing operation of the selection circuit 120, the touch driving signal TX output by the touch sensing circuit 133 may be provided to the one or more columns of touch electrodes (touch sensors) in the touch sensor array of the touch display panel 110 in step S210. Specifically, the touch driving signal TX is configured to scan the touch sensor array of the touch display panel 110 in a normal touch scanning mode based on a normal scan rate, and scan, in response to a touch event which is determined as occurring in a doze mode, the touch sensor array of the touch display panel 110 at a first scan rate in a fast touch scanning mode immediately preceding the normal touch scanning mode, wherein, the first scan rate is greater than the normal scan rate. For example (but not limited thereto), the first scan rate may be 180 Hz or other frequencies, and the normal scan rate may be 120 Hz or other frequencies.

In step S220, the touch sensing circuit 133 may receive a plurality of touch sensing signals from the touch sensor array of the touch display panel 110 through the selection circuit 120 and the multiplexers MUX. Then, the touch sensing circuit 133 can generate the touch sensing information INF according to the touch sensing signals, and provide the touch sensing information INF to the control circuit 132. Touch sensing information INF are digital information corresponding to sensed capacitance variation on one or more touch electrodes induced by a touch event. The control circuit 132 is coupled to the touch sensing circuit 133 to receive the touch sensing information INF. The control circuit 132 may perform an algorithm based on the touch sensing information INF to generate touch coordinate, and then provide the touch coordinate to the host 140. According to design requirements, the host 140 may include an application processor (AP), a central processing unit (CPU), and/or other processing circuits. The algorithm performed by the control circuit 132 can be selected according to design requirements.

FIG. 3A is a timing diagram of a touch sensing operation according to an embodiment of the disclosure. Please refer to FIG. 1 and FIG. 3A. The timing generation circuit 131 can provide the touch sensing frame synchronization signal TSVD and the touch sensing period synchronization signal TSHD to the control circuit 132. In the embodiment shown in FIG. 3A, the period during which the touch sensing period synchronization signal TSHD is at the high logic level is the touch sensing period, and the period during which the touch sensing period synchronization signal TSHD is at the low logic level is the display driving period.

In the doze mode DM, the touch sensing circuit 133 does not perform a doze-mode touch scan operation for each touch sensing period but performs the doze-mode touch scan operation once every three touch sensing periods, such as the doze-mode touch scan operations S1, S2, S3, and S4 shown in FIG. 3A. The doze-mode touch scan operations are not to scan the touch sensor array column by column to determine a touch coordinate but to scan the touch sensor array to determine whether a touch event occurs. During the doze mode DM, the control circuit 132 may configure the touch driving signal TX to scan the touch sensor array of the touch display panel 110 in the doze mode DM based on the second scan rate, so as to determine whether a touch event occurs. In the embodiment shown in FIG. 3A, the second scan rate in the doze mode DM is greater than the normal scan rate in the normal touch scanning mode AM, and the second scan rate in the doze mode DM is also greater than the first scan rate in the fast touch scanning mode FM. For example (but not limited thereto), the second scan rate in the doze mode DM may be 240 Hz or other frequencies, and the first scan rate in the fast touch scanning mode FM may be 180 Hz or other frequencies, and the normal scan rate in the normal touch scanning mode AM can be 120 Hz or other frequencies.

The control circuit 132 may perform the algorithm action A1 based on the touch sensing information generated by the touch scan operation S1, so as to determine whether a touch event occurs. The algorithm performed in the algorithm action A1 can be selected according to design requirements. It should be noted that the algorithm actions performed in the doze mode DM does not generate touch coordinate, so the control circuit 132 does not need to perform the touch-coordinate-reporting operation in the doze mode DM.

The other touch scan operations S2, S3, and S4 in the doze mode DM can be deduced by referring to the description related to the touch scan operation S1, so further description will be not be narrated herein. The control circuit 132 can perform the algorithm actions A2, A3, and A4 separately based on the touch sensing information generated by the touch scan operations S2, S3, and S4. The algorithm actions A2, A3, and A4 in the doze mode DM can be deduced by referring to the description related to the algorithm action A1, so the details are not repeated here.

In the embodiment shown in FIG. 3A, the touch event is assumed to occur at time t31. Because the touch event coincidentally occurs before the touch scan operation S4 is performed, the control circuit 132 can immediately learn that the touch event has occurred after the algorithm action A4 is completed, and then ends the doze mode DM and enters the fast touch scanning mode FM. Specifically, the first scan rate in the fast touch scanning mode FM is greater than the normal scan rate in the normal touch scanning mode AM. For example (but not limited thereto), the first scan rate in the fast touch scanning mode FM may be 180 Hz or other frequencies, and the normal scan rate in the normal touch scanning mode AM may be 120 Hz or other frequencies.

In the embodiment shown in FIG. 3A, in the fast touch scanning mode FM, the control circuit 132 performs a touch scan operation on the touch sensor array of the touch display panel 110 in the manner of dividing the touch scan operation of one touch sensing frame to be performed in multiple touch sensing periods. For example, the touch scan operation S5 shown in FIG. 3A is performed in three touch sensing periods. The control circuit 132 performs a touch scan operation S5 on the touch sensor array of the touch display panel 110 through the touch sensing circuit 133, so as to obtain touch sensing information INF with respect to a touch sensing frame. The implementation details of the touch scan operation S5 can be determined according to design requirements.

The control circuit 132 may perform the algorithm action A5 based on the touch sensing information generated by the touch scan operation S5, so as to generate the touch coordinate where the touch event occurs. The algorithm performed in the algorithm action A5 can be selected according to design requirements. After completing the algorithm action A5, the control circuit 132 may perform a touch-coordinate-reporting operation at time t32 to provide the touch coordinate to the host 140. The length of time from time t31 (the time at which the first touch event occurs in the doze mode DM) to time t32 (the time at which the control circuit 132 reports the touch coordinate) can be referred to as the first tap latency TL3 under the doze mode DM.

The length of time in the fast touch scanning mode FM can be defined according to design requirements. In the embodiment shown in FIG. 3A, since the normal touch scanning mode AM is synchronized with display frame periods, the fast touch scanning mode FM can last until a next display frame period begins. The other touch scan operations S6 and S7 in the fast touch scanning mode FM can be deduced by referring to the description related to the touch scan operation S5, so further details will not be narrated therein. The control circuit 132 can perform the algorithm actions A6 and A7 separately based on the touch sensing information generated by the touch scan operations S6 and S7. The algorithm actions A6 and A7 in the fast touch scanning mode FM can be deduced by referring to the description related to the algorithm action A5, so further details will not be narrated therein.

After the fast touch scanning mode FM ends, the control circuit 132 can enter the normal touch scanning mode AM. In the embodiment shown in FIG. 3A, in the normal touch scanning mode AM, the control circuit 132 performs a touch scan operation on the touch sensor array of the touch display panel 110 in the manner of dividing the touch scan operation of one touch sensing frame to be performed in multiple touch sensing periods. For example, the touch scan operation S8 shown in FIG. 3A is performed during five touch sensing periods, and the touch scan operation S9 shown in FIG. 3A is performed in the other five touch sensing periods.

The control circuit 132 can perform a touch scan operation S8 on the touch sensor array of the touch display panel 110 through the touch sensing circuit 133, so as to obtain touch sensing information INF with respect to a touch sensing frame. The implementation details of the touch scan operation S8 can be determined according to design requirements. The control circuit 132 can perform the algorithm action A8 based on the touch sensing information generated by the touch scan operation S8, so as to generate a touch coordinate where a subsequent touch event (other than the first touch event, and not shown FIG. 3A) occurs. The algorithm performed in the algorithm action A8 can be selected according to design requirements. After completing the algorithm action A8, the control circuit 132 may perform a touch-coordinate-reporting operation to provide the touch coordinate to the host 140. The normal touch scanning mode AM illustrated in FIG. 3A includes another touch scan operation S9 and a corresponding algorithm action A9, to scan and report for a subsequent touch event, which can be deduced by referring to the description related to the touch scan operation S8, so the details will not be repeated.

FIG. 3B is a timing diagram of a touch sensing operation according to a related art. The doze mode DM, the normal touch scanning mode AM, the touch sensing frame synchronization signal TSVD, the touch sensing period synchronization signal TSHD, the touch scan operation S3, the touch scan operation S4, the touch scan operation S8, the touch scan operation S9, the algorithm action A3, the algorithm action A4, and the algorithm action A8 shown in FIG. 3B can be referred to the related description regarding FIG. 3A, so further details will not be repeated here. It is noted that the conventional touch sensing operation of FIG. 3B does not implement the fast touch scanning mode FM, and the doze-mode touch scan rate is 120 Hz same as the normal touch scan rate 120 Hz at the normal touch scanning mode, which is lower than the doze-mode touch scan rate shown in the embodiment of FIG. 3A.

In FIG. 3B, the first touch event under the doze mode is assumed to occur at time t41, which is coincidentally occurs before the touch scan operation S4 is performed at the doze mode, and the control circuit 132 cannot a touch coordinate until the normal-mode touch scan operation S8 and the algorithm action A8 is completed. The length of time from time t41 (the time at which the first touch event occurs in the doze mode DM) to time t42 (the time at which the control circuit 132 reports the touch coordinate) may be referred to as the first tap latency TL4 under the doze mode. Comparing the conventional art shown in FIG. 3B with the embodiment shown in FIG. 3A, it is known that the use of the fast touch scanning mode FM can shorten the first tap latency under the doze mode, because the fast touch scanning mode FM provides an opportunity to perform a touch scan operation that may be not as precise as in the normal touch scanning mode but is a faster scanning and reporting than in the normal touch scanning mode.

Figure 4A:
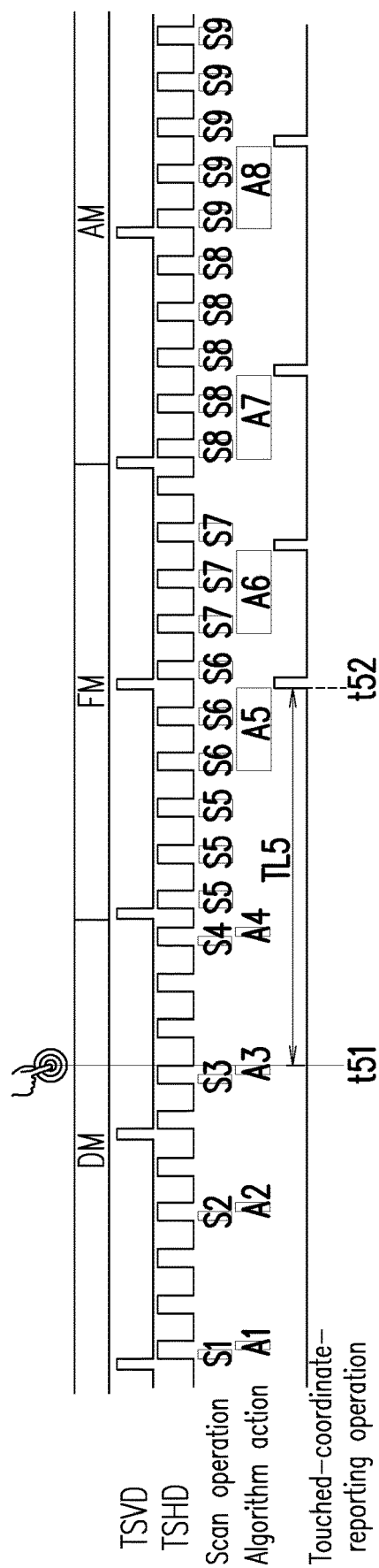
FIG. 4A is a timing diagram of a touch sensing operation according to an embodiment of the disclosure.
Figure 4B:
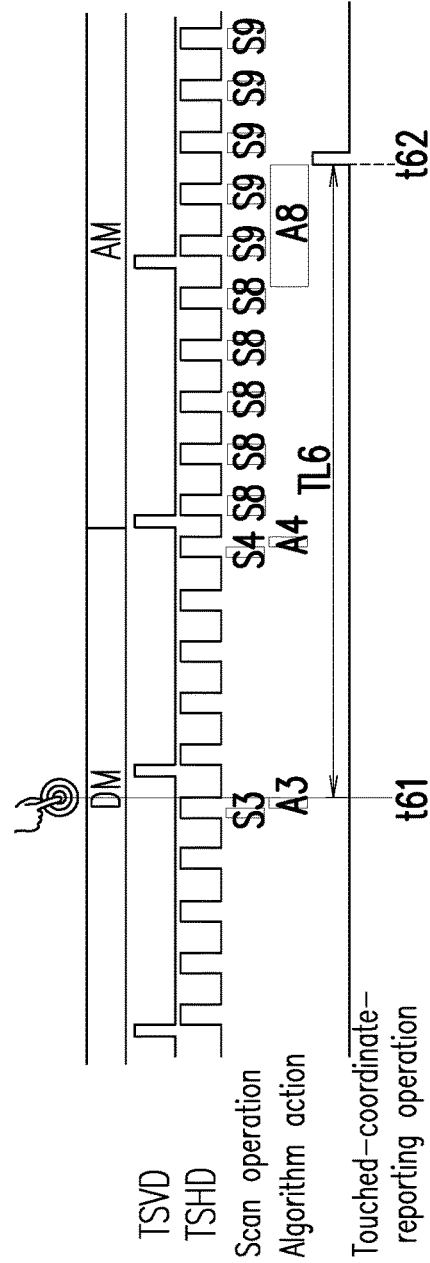
FIG. 4B is a timing diagram of a touch sensing operation according to a related art.

FIG. 4A and FIG. 4B are respectively a timing diagram of a touch sensing operation by the touch display driving apparatus 130 using the fast touch scanning mode and a timing diagram of a touch sensing operation by a conventional touch display driving apparatus without the fast touch scanning mode. Touch scan operations and algorithm actions in FIG. 4A and FIG. 4B can be deduced by referring to the description related to FIG. 3A and FIG. 3B so the details will not be repeated. FIG. 4A and FIG. 4B illustrate a condition that the first touch event under the doze mode occurs right after a doze-mode touch scan operation S3 and a corresponding algorithm action A3 are just completed, such as the time t51 or t61 in FIG. 4A and FIG. 4B. In such a condition, the conventional touch display driving apparatus (without using the fast touch scanning mode FM) can only detect that the first touch event occurs by the next doze-mode touch scan operation S4 and the corresponding algorithm action A4 and then starts the normal touch scanning mode AM in response. After the first touch scan operation S8 of the normal touch scanning mode AM and the corresponding algorithm action A8 are completed, the conventional touch display driving apparatus reports a touch coordinate at the time t62, as illustrated in FIG. 4B. The first tap latency TL6 is long. Comparatively, as shown in FIG. 4A, though the touch display driving apparatus using the fast touch scanning mode FM and a faster doze-mode touch scan rate also detects that the first touch event occurs by the next doze-mode touch scan operation S4 and the corresponding algorithm action A4, the touch display driving apparatus then starts the fast touch scanning mode FM in response. After the first touch scan operation S5 of fast touch scanning mode FM and the corresponding algorithm action A5 are completed, the touch display driving apparatus reports a touch coordinate at the time t52, as illustrated in FIG. 4A. That is, the touch display driving apparatus may quickly report the touch coordinate before entering the normal touch scanning mode AM, which results in a shorter first tap latency TL5.

Figure 5:
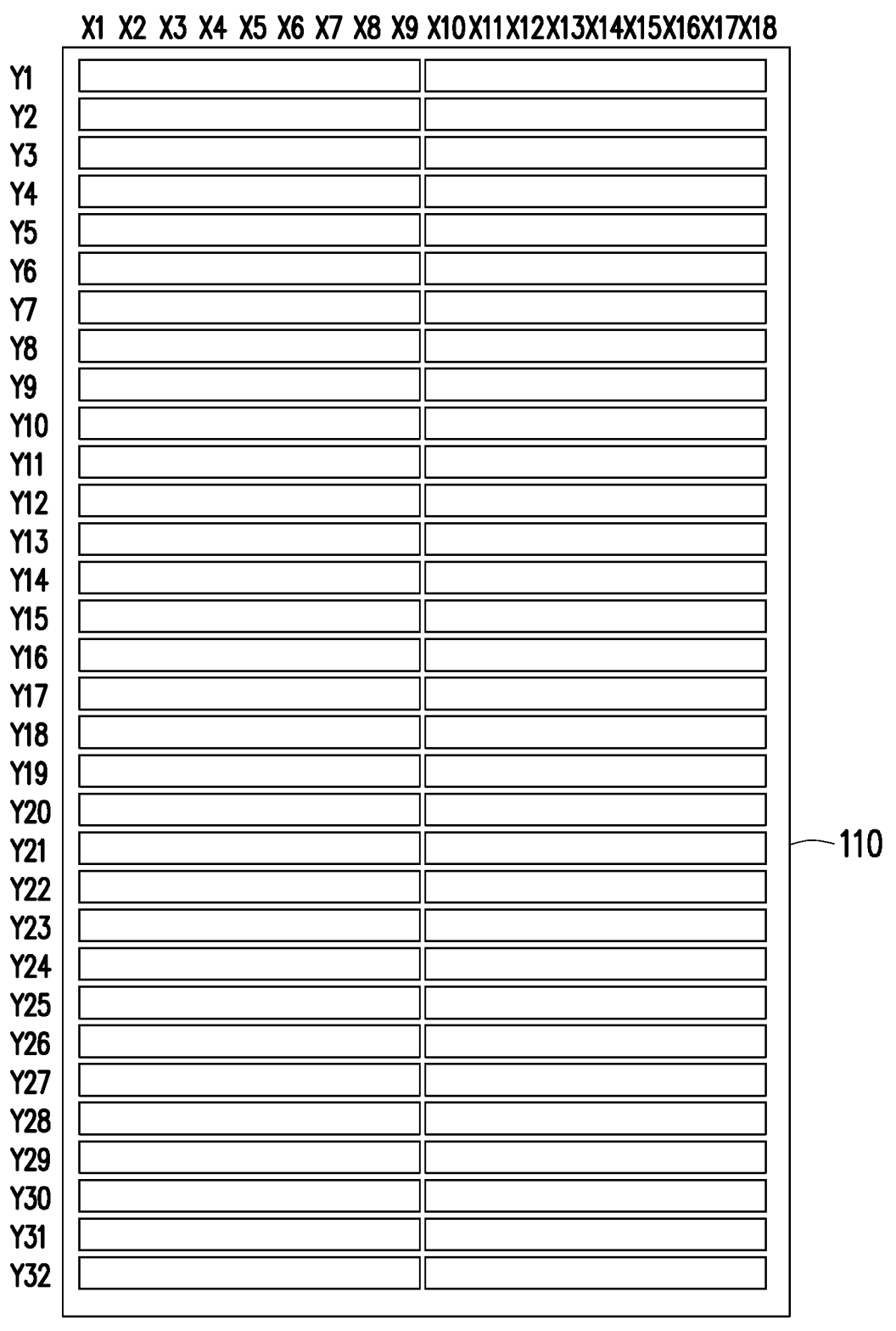

The touch sensor array of the touch display panel 110 may include 18*32 touch electrodes (touch sensors) as an example, represented by columns X1 to X18 and rows Y1 to Y32. Depending on different touch scanning modes (DM, FM and AM), the touch electrodes may be connected in different ways as examples shown in FIG. 5, FIGS. 7A-7C and FIGS. 9A-9C. FIG. 5 is a schematic diagram illustrating a touch sensor array of a touch display panel 110 in a doze mode DM according to an embodiment. In the doze mode DM, touch electrodes of the columns X1 to X9 are connected together, and touch electrodes of the columns X10 to X18 are connected together, for each respective rows Y1-Y32. That is, a left half and a right half of the touch sensor array are arranged like a touch electrode column.

Please refer to FIG. 1 and FIG. 5. According to design requirements, the touch sensing circuit 133 may include one or more analog front end (AFE) circuits. In the application example shown in FIG. 5, the touch sensing circuit 133 may include two AFE circuits, and one of the AFE circuits may be coupled to the touch electrode rows Y1-Y32 of the left half of the touch sensor array forming one touch electrode column (i.e. X1-X9 connected together in each row) shown in FIG. 5 through the multiplexer MUX and the selection circuit 120, for processing touch sensing signals from the left half of the touch sensor array. Similarly, the other AFE circuit may be coupled to the touch electrode rows Y1-Y32 of the right half of the touch sensor array forming one touch electrode column (i.e. X10-X18 connected together in each row) shown in FIG. 5 through the multiplexer MUX and the selection circuit 120, for processing touch sensing signals from the right half of the touch sensor array. The touch sensing circuit 133 can scan/sense whether the touch event occurs in the doze mode DM.

Figure 6:
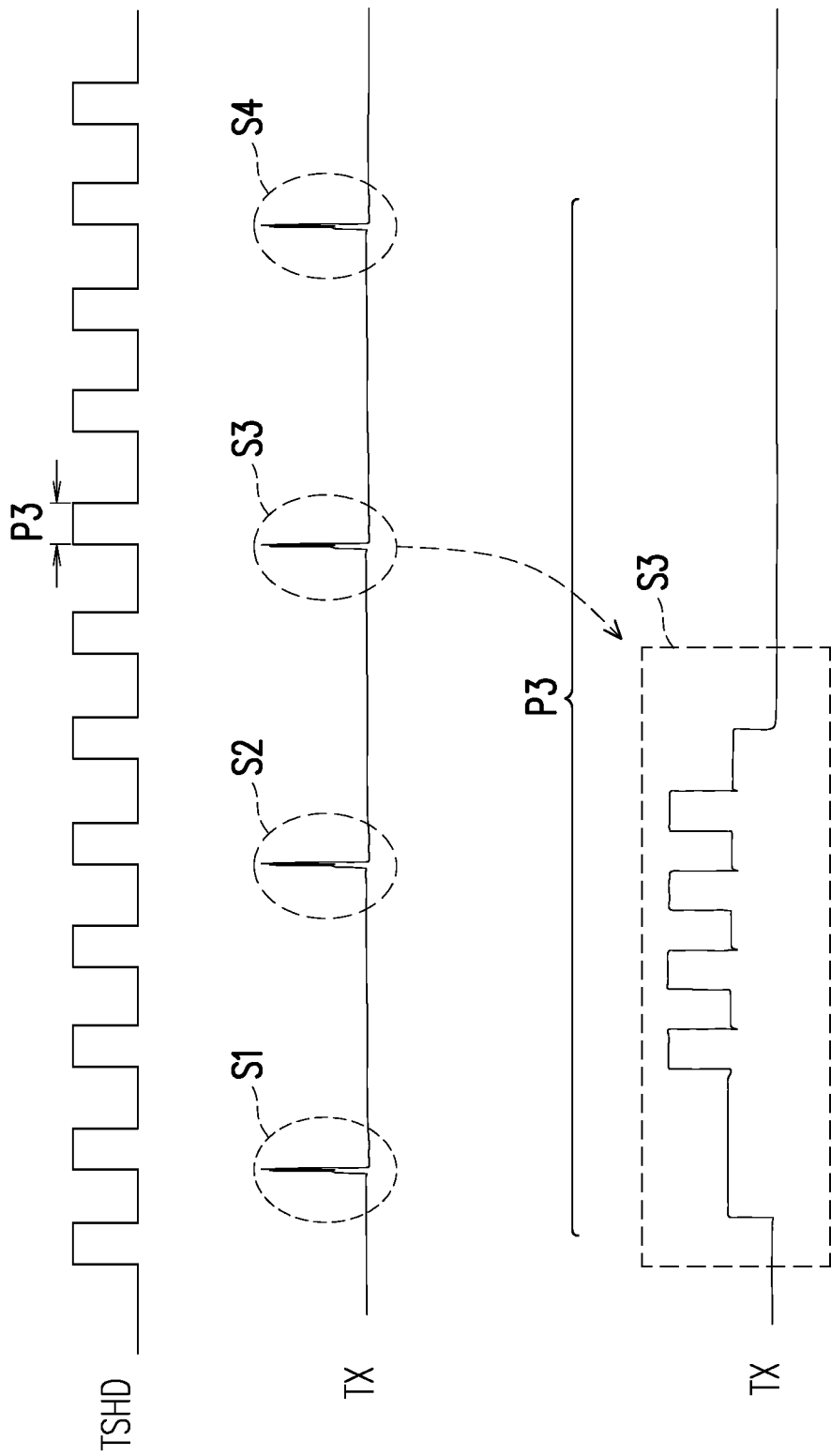
FIG. 6 is a timing diagram illustrating the touch sensing period synchronization signal and the touch driving signal in the doze mode according to an embodiment.

FIG. 6 is a timing diagram illustrating the touch sensing period synchronization signal TSHD and the touch driving signal TX in the doze mode DM according to an embodiment. The upper part of FIG. 6 shows the waveforms of the touch sensing period synchronization signal TSHD and the touch driving signal TX. Specifically, the touch sensing period synchronization signal TSHD and the touch scan operations S1, S2, S3 and S4 can be deduced by referring to the related descriptions of the touch sensing period synchronization signal TSHD and touch scan operations S1, S2, S3, and S4 shown in FIG. 3A, so further details will not be repeated.

The waveform of the touch driving signal TX during the touch sensing period P3, wherein the touch scan operation S3 is performed, is shown as an enlarged view in the lower part of FIG. 6. As shown in the lower part of FIG. 6, the touch driving signal TX of the doze mode DM includes a second repetitive waveform in each touch sensing period during which the doze-mode touch scanning operation is performed, and the second repetitive waveform corresponds to the second scan rate in the doze mode DM. In the example in FIG. 3A, the second scan rate in the doze mode DM may be 240 Hz. Touch scan rate 240 Hz means that the whole touch sensor array are fully scanned four times (regardless of the way that the touch electrodes are connected) during one display frame period based on the display frame rate 60 Hz. Specifically, the second scan rate in the doze mode DM is greater than the normal scan rate in the normal touch scanning mode AM, and the second repetitive waveform in the doze mode DM is different from the normal repetitive waveform in the normal touch scanning mode AM.

Figure 7A:
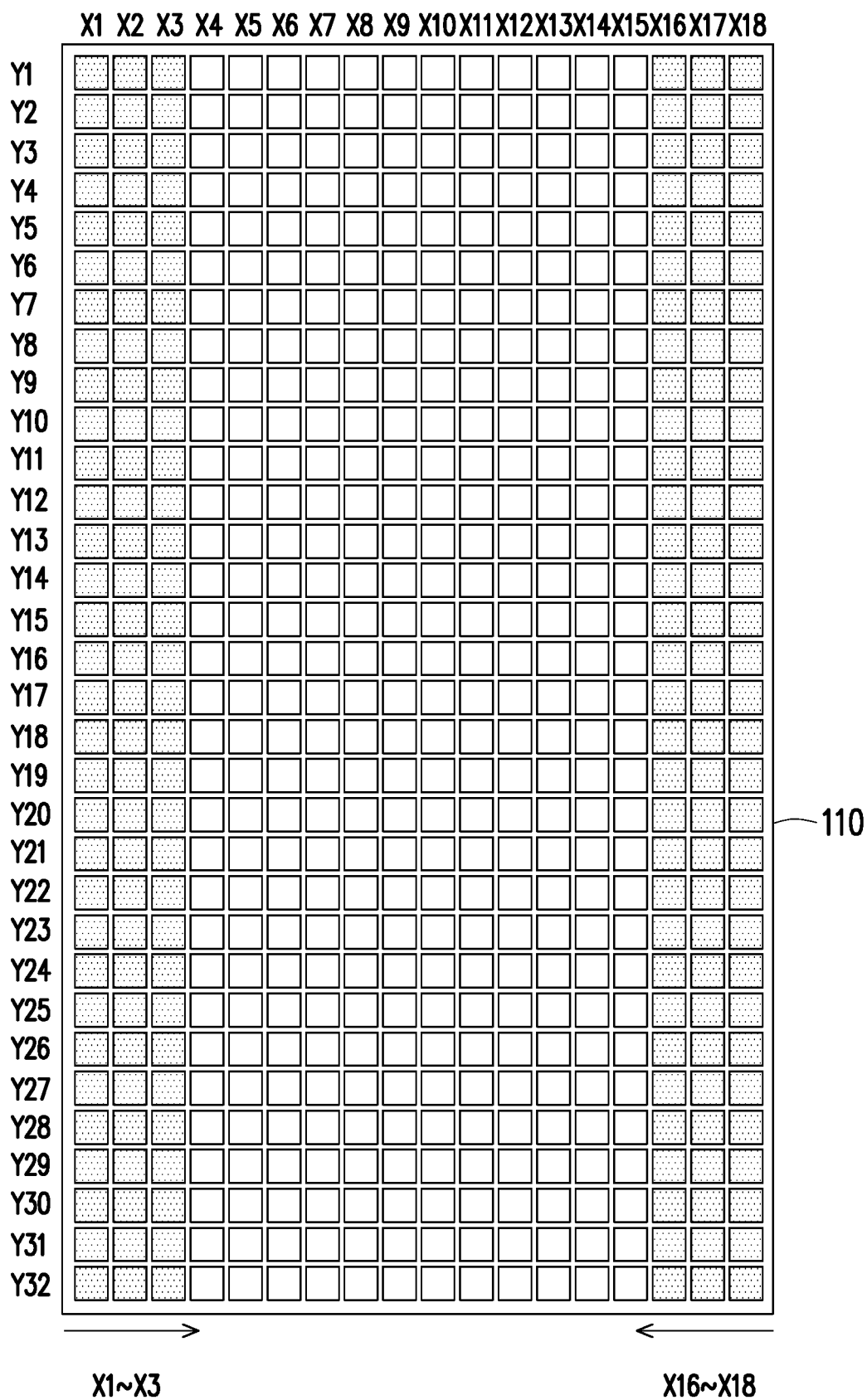
FIG. 7A to FIG. 7C are schematic diagrams illustrating the operation of a touch sensor array of a touch display panel in a fast touch scanning mode according to an embodiment.
Figure 7B:
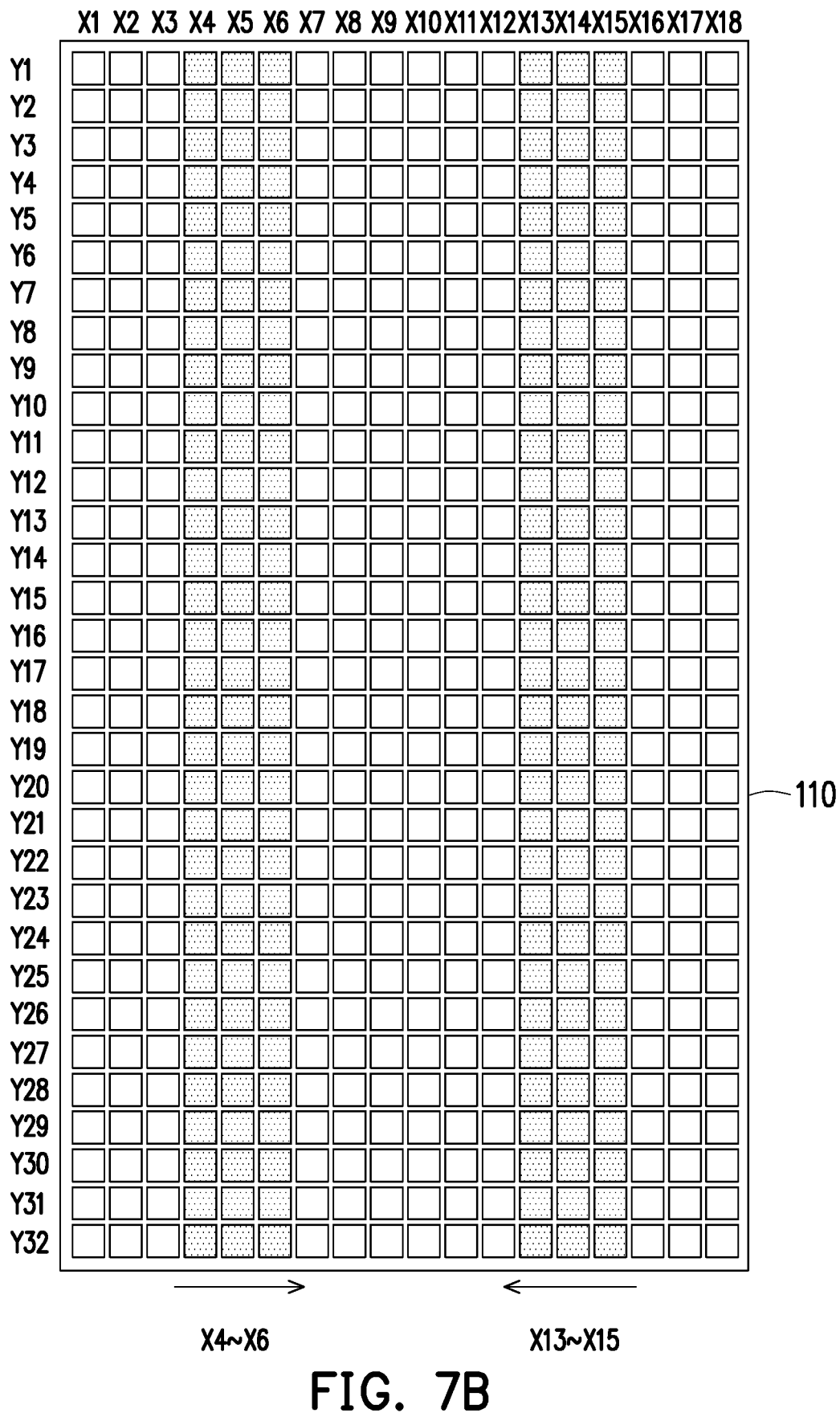
Figure 7C:
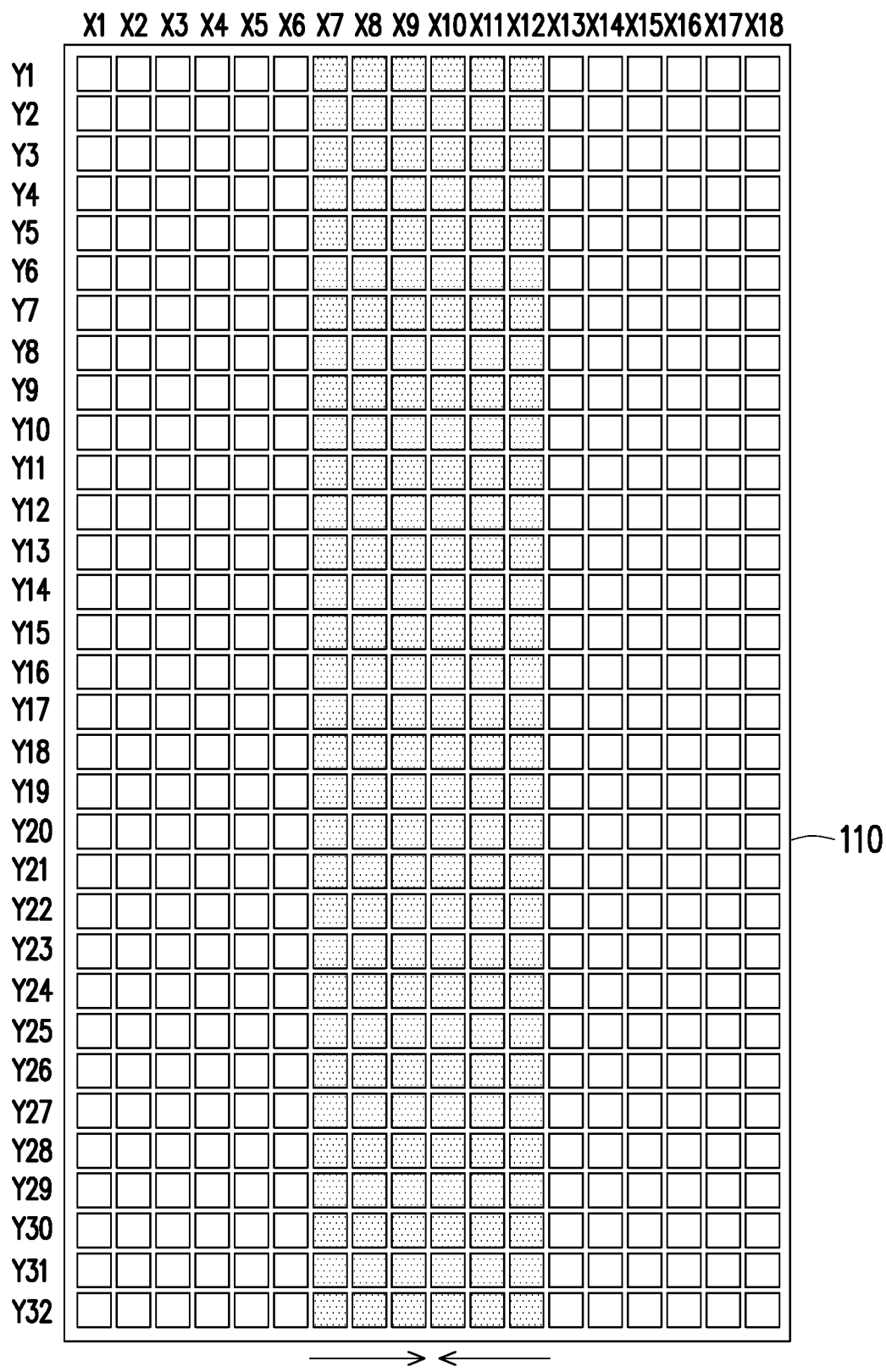

FIG. 7A to FIG. 7C are schematic diagrams illustrating the operation of a touch sensor array of the touch display panel 110 in the fast touch scanning mode FM according to an embodiment. In the application examples shown in FIG. 7A to FIG. 7C, the touch sensing circuit 133 may include two AFE circuits, and each one of the AFE circuits may be sequentially coupled to nine touch electrode columns of a corresponding half of the touch sensor array shown in FIG. 7A to FIG. 7C through the multiplexer MUX and the selection circuit 120. In the application examples shown in FIG. 3A and FIG. 7A to FIG. 7C, the touch sensing circuit 133 can perform a touch scan operation of one touch sensing frame in three touch sensing periods in the fast touch scanning mode FM.

Please refer to FIG. 1, FIG. 3A and FIG. 7A. In the first touch sensing period (P51) of the fast touch scanning mode FM, the touch sensing circuit 133 can perform the first part of the touch scan operation S5, which is to sequentially scan and sense the touch electrodes (touch sensors) in the column X1 to the column X3 of the touch sensor array of the touch display panel 110 through the multiplexer MUX and the selection circuit 120 and sequentially scan and sense the touch electrodes (touch sensors) in the column X18 to the column X16 of the touch sensor array of the touch display panel 110 through the multiplexer MUX and the selection circuit 120. Please refer to FIG. 1, FIG. 3A and FIG. 7B, in the second touch sensing period (P52), the touch sensing circuit 133 can perform the second part of the touch scan operation S5, which is to sequentially scan and sense the touch electrodes (touch sensors) in the column X4 to the column X6 of the touch sensor array of the touch display panel 110 through the multiplexer MUX and the selection circuit 120 and sequentially scan and sense the touch electrodes (touch sensors) in the column X15 to the column X13 of the touch sensor array of the touch display panel 110 through the multiplexer MUX and the selection circuit 120. Likewise, in the third touch sensing period (P53), the touch sensing circuit 133 can perform the third part of the touch scan operation S5, which is to sequentially scan and sense the touch electrodes (touch sensors) in the column X7 to the column X9 of the touch sensor array of the touch display panel 110 through the multiplexer MUX and the selection circuit 120 and sequentially scan and sense the touch electrodes (touch sensors) in the column X12 to the column X10 of the touch sensor array of the touch display panel 110 through the multiplexer MUX and the selection circuit 120. The touch scan operation S5 are completely performed after three touch sensing periods P51, P52, and P53. After the full touch scan operation S5 is completed, the control circuit 132 can perform the algorithm action A5 according to the touch sensing information INF received from the touch sensing circuit 133 during the three touch sensing periods to generate a touch coordinate.

Figure 8:
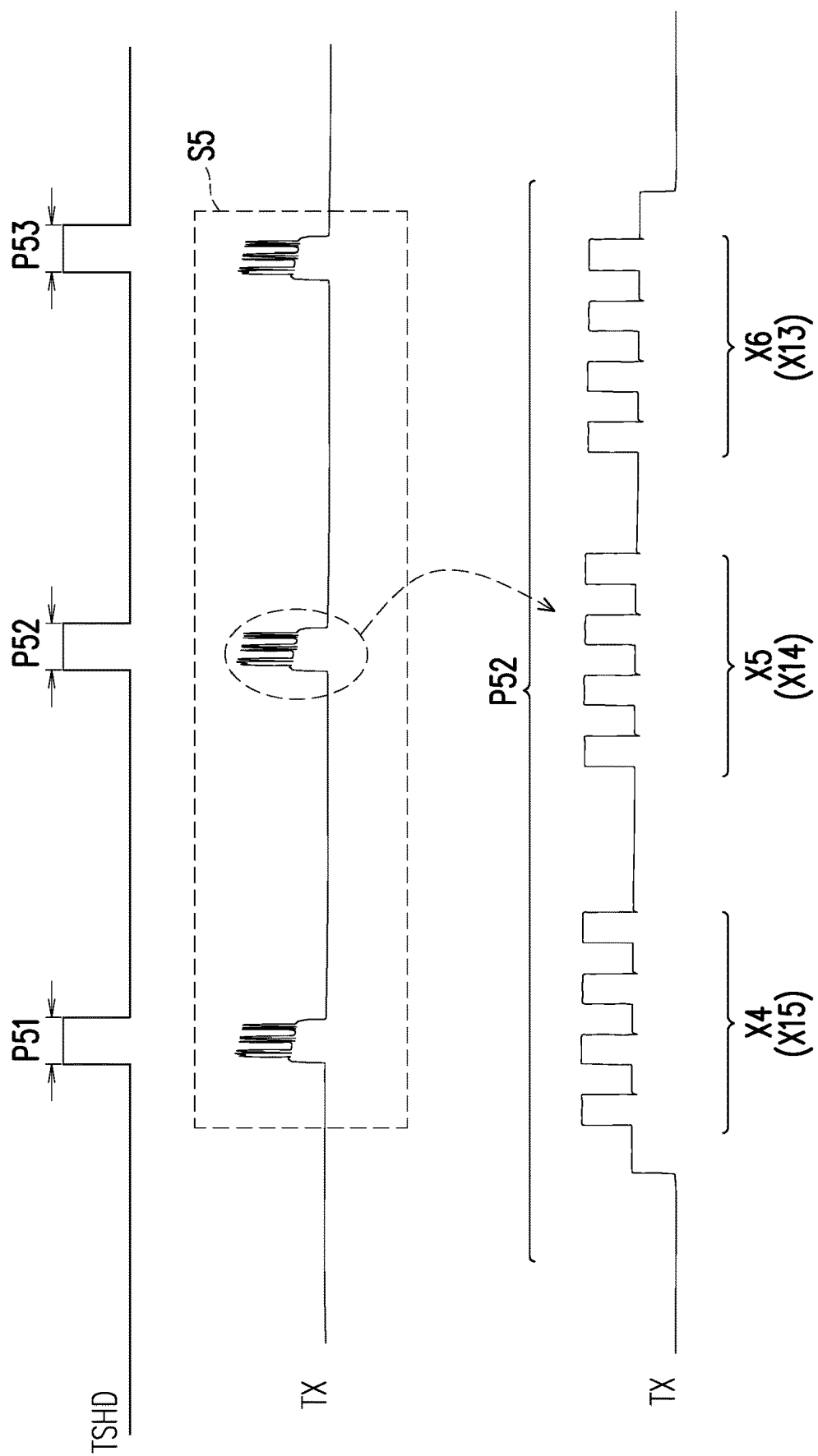
FIG. 8 is a timing diagram of the touch sensing period synchronization signal TSHD and the touch driving signal TX in the fast touch scanning mode FM according to an embodiment.

FIG. 8 is a timing diagram of the touch sensing period synchronization signal TSHD and the touch driving signal TX in the fast touch scanning mode FM according to an embodiment. The upper part of FIG. 8 shows the waveforms of the touch sensing period synchronization signal TSHD and the touch driving signal TX. Specifically, the touch sensing period synchronization signal TSHD and the touch scan operation S5 can be deduced by referring to the related descriptions of the touch sensing period synchronization signal TSHD and touch scan operation S5 shown in FIG. 3A, so further details will not be repeated.

The three parts of the touch scan operation S5 during the touch sensing period P51, P52 and P53 are similar. For an exemplary purpose, the waveform of the touch driving signal TX during the touch sensing period P52, wherein the second part of the touch scan operation S5 is performed, is shown as an enlarged view in the lower part of FIG. 8. Other parts of the touch scan operation S5 during the touch sensing periods P51 and P53 can be deduced by referring to the related descriptions in the above and details will not be repeated.

The touch driving signal TX of the fast touch scanning mode FM includes a first repetitive waveform in each touch sensing period (e.g. P52 in FIG. 8) during which a part of a fast-touch-scanning-mode touch scanning operation is performed, and the first repetitive waveform corresponds to the first scan rate in the fast touch scanning mode FM. Based on the example in FIG. 8, the first repetitive waveform of the touch driving signal TX includes three groups of pulses and each group of pulses are transmitted to the touch electrodes of a corresponding touch electrode column such as X4, X5 or X6. Based on the in FIG. 3A and FIG. 8, the first scan rate in the fast touch scanning mode FM may be 180 Hz. Touch scan rate 180 Hz means that the whole touch sensor array are fully scanned three times during one display frame period based on the display frame rate 60 Hz. Specifically, the first scan rate in the fast touch scanning mode FM is greater than the normal scan rate in the normal touch scanning mode AM, and the first repetitive waveform in the fast touch scanning mode FM is different from the normal repetitive waveform in the normal touch scanning mode AM.

Figure 9A:
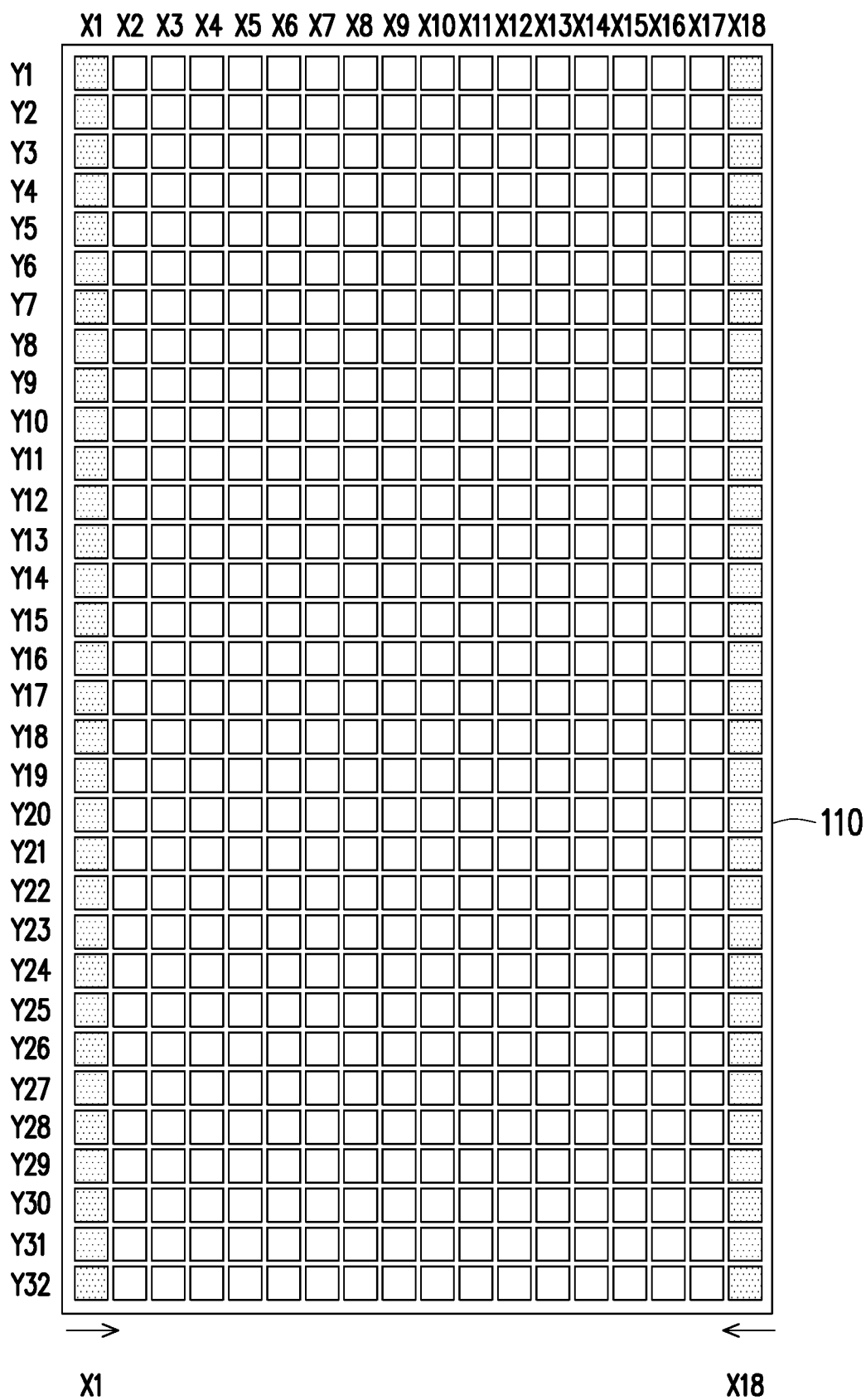
FIG. 9A to FIG. 9C are schematic diagrams illustrating the operation of a touch sensor array of a touch display panel in a normal touch scanning mode according to an embodiment.
Figure 9B:
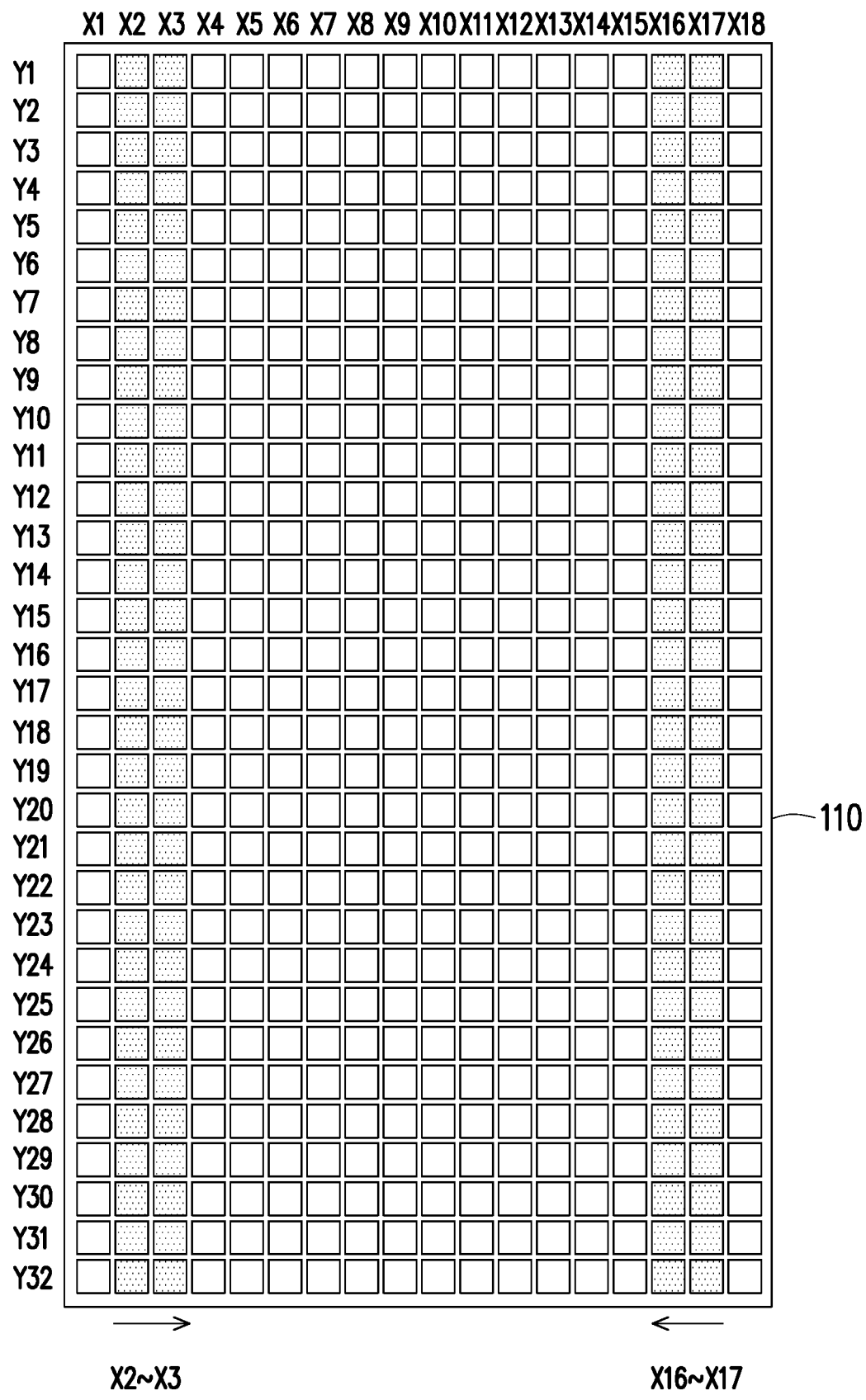
Figure 9C:
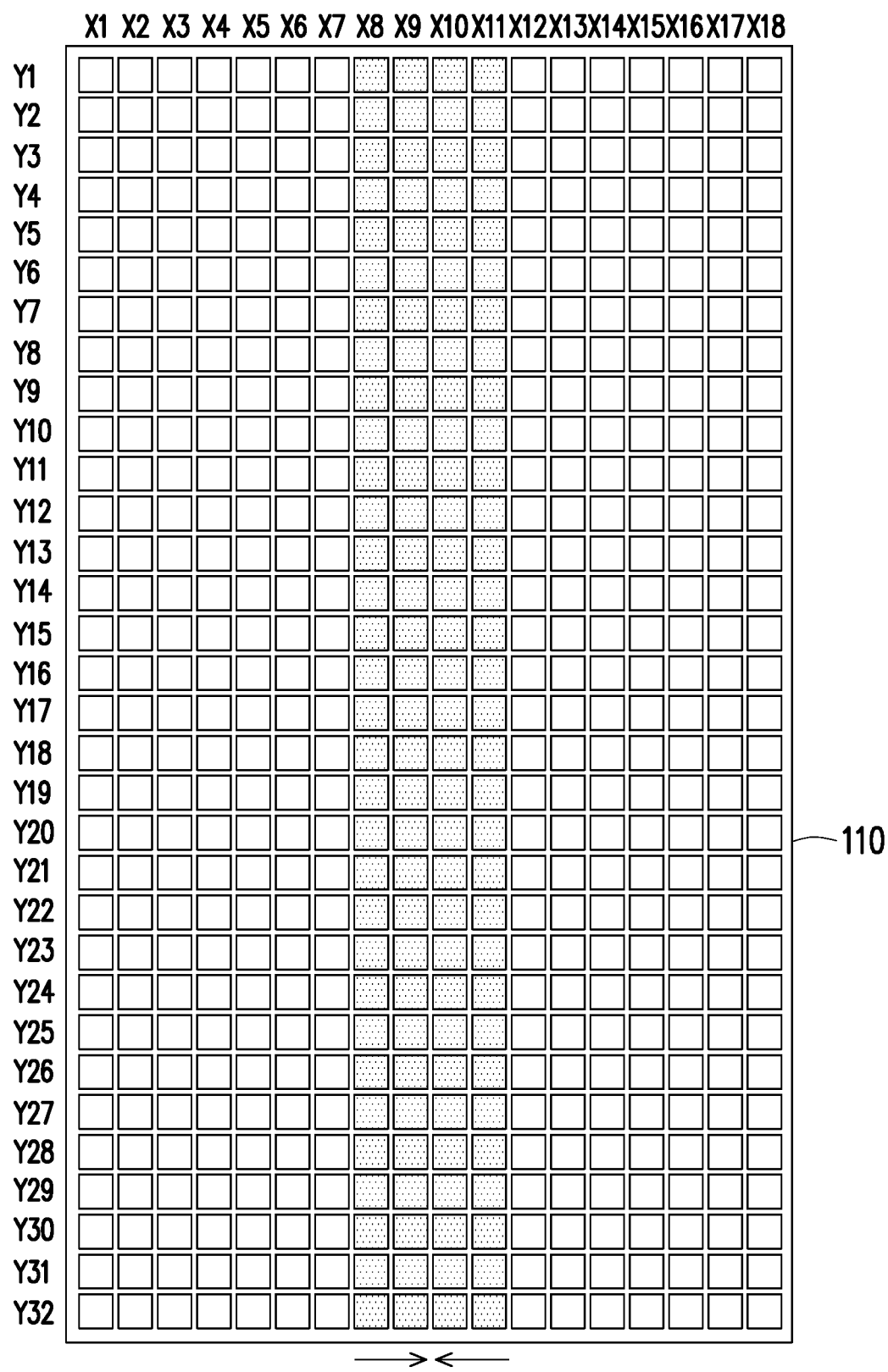

FIG. 9A to FIG. 9C are schematic diagrams illustrating the operation of a touch sensor array of the touch display panel 110 in the normal touch scanning mode AM according to an embodiment. In the application examples shown in FIG. 9A to FIG. 9C, the touch sensing circuit 133 may include two AFE circuits, and each one of the AFE circuits may be sequentially coupled to nine touch electrode columns of a corresponding half of the touch sensor array shown in FIG. 9A to FIG. 9C through the multiplexer MUX and the selection circuit 120. In the application examples shown in FIG. 3A and FIG. 9A to FIG. 9C, the touch sensing circuit 133 can perform a touch scan operation of one touch sensing frame in five touch sensing periods in the normal touch scanning mode AM.

Please refer to FIG. 1, FIG. 3A and FIG. 9A. In the first touch sensing period (P81), the touch sensing circuit 133 can perform the first part of the touch scan operation S8, which is to scan and sense the touch electrodes (touch sensors) in the column X1 of the touch sensor array of the touch display panel 110 through the multiplexer MUX and the selection circuit 120 and scan and sense the touch electrodes (touch sensors) in the column X18 of the touch sensor array of the touch display panel 110 through the multiplexer MUX and the selection circuit 120. Please refer to FIG. 1, FIG. 3A and FIG. 9B, the second touch sensing period (P82), the touch sensing circuit 133 can perform the second part of the touch scan operation S8, which is to sequentially scan and sense the touch electrodes (touch sensors) in the column X2 to the column X3 of the touch sensor array of the touch display panel 110 through the multiplexer MUX and the selection circuit 120 and sequentially scan and sense the touch electrodes (touch sensors) in the column X17 to the column X16 of the touch sensor array of the touch display panel 110 through the multiplexer MUX and the selection circuit 120. Likewise, the touch sensing circuit 133 can perform the third part and the fourth part of the touch scan operation S8 respectively in the third touch sensing period (P83) and the fourth touch sensing period (P84), and in the fifth touch sensing period (P85), the touch sensing circuit 133 can perform the fifth part the touch scan operation S8, to scan and sense the touch electrodes (touch sensors) in the column X8 to the column X9 of the touch sensor array of the touch display panel 110 through the multiplexer MUX and the selection circuit 120 and scan and sense the touch electrodes (touch sensors) in the column X11 to the tenth column X10 of the touch sensor array of the touch display panel 110 through the multiplexer MUX and the selection circuit 120. The touch scan operation S8 is completely performed after five touch sensing periods P81 to P85. After the full touch scan operation S8 is completed, the control circuit 132 can perform the algorithm action A8 according to the touch sensing information INF received from the touch sensing circuit 133 during the five touch sensing periods to generate a touch coordinate.

Figure 10:
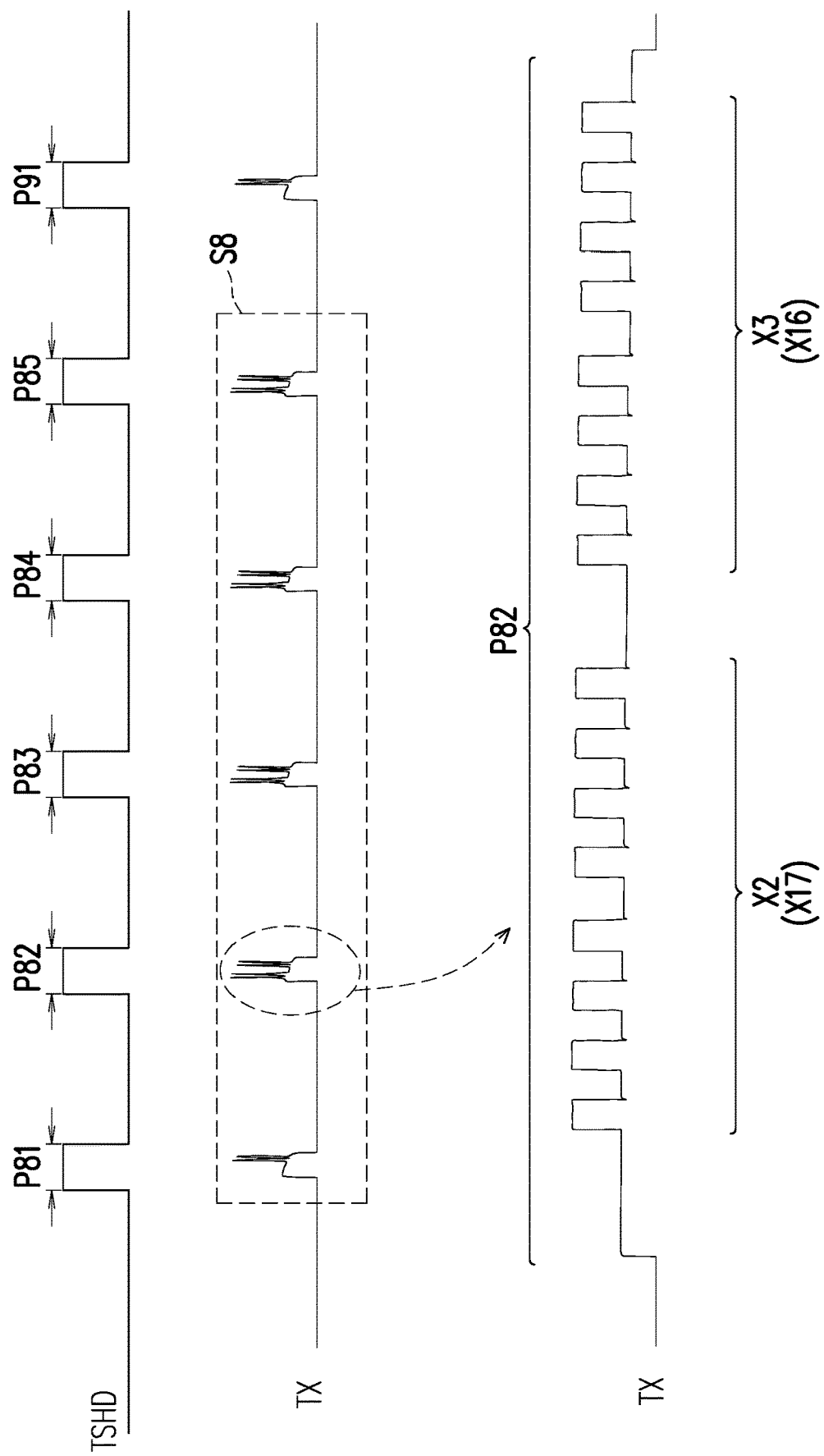
FIG. 10 is a timing diagram of the touch sensing period synchronization signal and the touch driving signal in the normal touch scanning mode according to an embodiment.

FIG. 10 is a timing diagram of the touch sensing period synchronization signal TSHD and the touch driving signal TX in the normal touch scanning mode AM according to an embodiment. The upper part of FIG. 10 shows the waveforms of the touch sensing period synchronization signal TSHD and the touch driving signal TX. Specifically, the touch sensing period synchronization signal TSHD and the touch scan operation S8 can be deduced by referring to the related descriptions of the touch sensing period synchronization signal TSHD and touch scan operation S8 shown in FIG. 3A, so further details will not be repeated.

Except the first part of the touch scan operation S8, the second part to the fifth part of the touch scan operation S8 are similar. For an exemplary purpose, the waveform of the touch driving signal TX during the touch sensing period P82, wherein the second part of the touch scan operation S8 is performed, is shown as an enlarged view in the lower part of FIG. 10. Other third to fifth parts of the touch scan operation S8 during the touch sensing periods P83 to P85 can be deduced by referring to the related descriptions in the above and details will not be repeated.

The touch driving signal TX of the normal touch scanning mode AM includes a normal repetitive waveform in each touch sensing period (e.g. P82 in FIG. 10) during which a part of a normal-touch-scanning-mode touch scanning operation is performed, and the normal repetitive waveform corresponds to the normal scan rate in the normal touch scanning mode AM. Based on the example in FIG. 10, the normal repetitive waveform of the touch driving signal TX includes two groups of pulses and each group includes eight pulses transmitted to the touch electrodes of a corresponding touch electrode column such as X2 or X3. Based on the in FIG. 3A and FIG. 10, the normal scan rate in the normal touch scanning mode AM may be 120 Hz. Touch scan rate 120 Hz means that the whole touch sensor array are fully scanned twice during one display frame period based on the display frame rate 60 Hz. Specifically, the normal scan rate in the normal touch scanning mode AM is less than the second scan rate in the doze mode DM and the first scan rate in the fast touch scanning mode FM, and the normal repetitive waveform in the normal touch scanning mode AM is different from the first repetitive waveform in the fast touch scanning mode FM.

Figure 11:
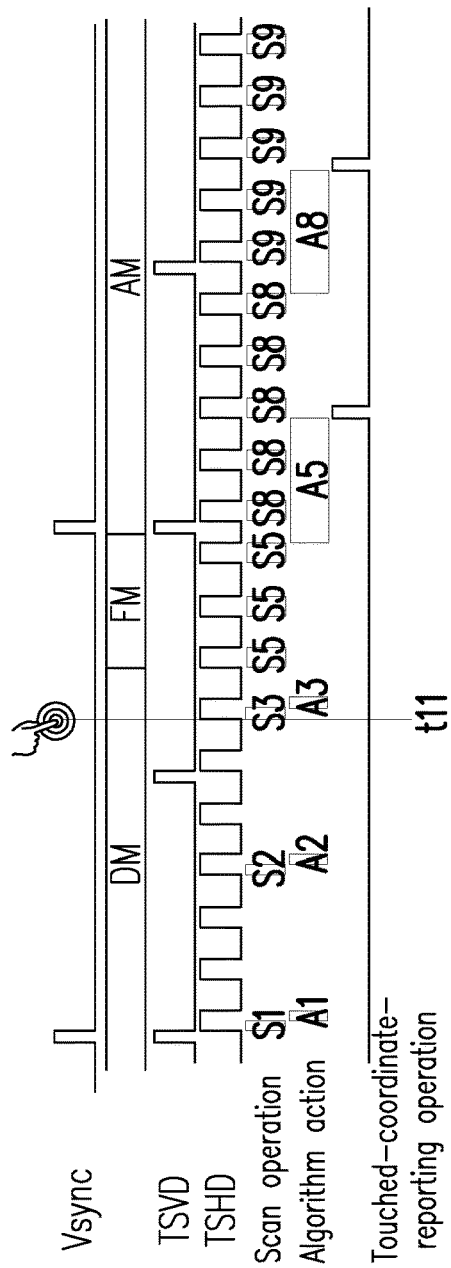
FIG. 11 is a timing diagram of a touch sensing operation according to an embodiment of the disclosure.

In the embodiment of FIG. 3A or FIG. 4A, the start of the fast touch scanning mode FM and the start of the normal touch scanning mode AM are in synchronization with the display frame synchronization signal (Vsync), which means that the touch display driving apparatus does not enter the fast touch scanning mode FM immediately in response to determining that the first touch event in the doze mode occurs. In another embodiment, the fast touch scanning mode FM does not need to be in synchronization with the display frame synchronization signal, as illustrated in FIG. 11. FIG. 11 is a timing diagram of a touch sensing operation according to an embodiment of the disclosure. The embodiment shown in FIG. 11 can be deduced by referring to the related description of FIG. 3A, so further details will not be repeated. Please refer to FIG. 1 and FIG. 11. The control circuit 132 may configure the touch driving signal TX to scan the touch sensor array of the touch display panel 110 in the doze mode DM based on the second scan rate (for example, 240 Hz or other frequencies), so as to determine whether a touch even occurs. The touch sensing circuit 133 can perform doze-mode touch scan operations on the touch sensor array of the touch display panel 110 and the control circuit 132 can perform the algorithm actions so as to determine whether a touch event occurs.

In the embodiment shown in FIG. 11, the first touch event in the doze mode is assumed to occur at time t11, which is before the third doze-mode touch scan operation S3 is performed. The control circuit 132 can learn that the first touch event has occurred after the algorithm action A3 is completed, and in response, the touch display driving apparatus 130 ends the doze mode DM and enters the fast touch scanning mode FM. In such a condition, the touch display driving apparatus 130 does not need to perform the fourth doze-mode touch scan operation. In the fast touch scanning mode FM, the touch sensor circuit 133 performs the first fast-touch-scanning-mode touch scan operation S5 on the touch sensor array of the touch display panel 110 during three touch sensing periods (the period during which the touch sensing period synchronization signal TSHD is at a high logic level), so as to obtain touch sensing information INF corresponding to a touch sensing frame. The control circuit 132 can perform the algorithm action A5 based on the touch sensing information generated by the touch scan operation S5, so as to generate the touch coordinate of the touch event. After the algorithm action A5 is completed, the control circuit 132 may perform a touch-coordinate-reporting operation at time t112 to provide the touch coordinate to the host 140.

Since the start of the normal touch scanning mode AM is in synchronization with the display frame synchronization signal, the fast touch scanning mode FM can last until the next pulse of the display frame synchronization signal Vsync. After the fast touch scanning mode FM ends, the touch display driving apparatus 130 can enter the normal touch scanning mode AM. The operation in the normal touch scanning mode AM shown in FIG. 11 can be deduced by referring to the related description of the normal touch scanning mode AM shown in FIG. 3A, so further details will not be repeated herein.

Figure 12:
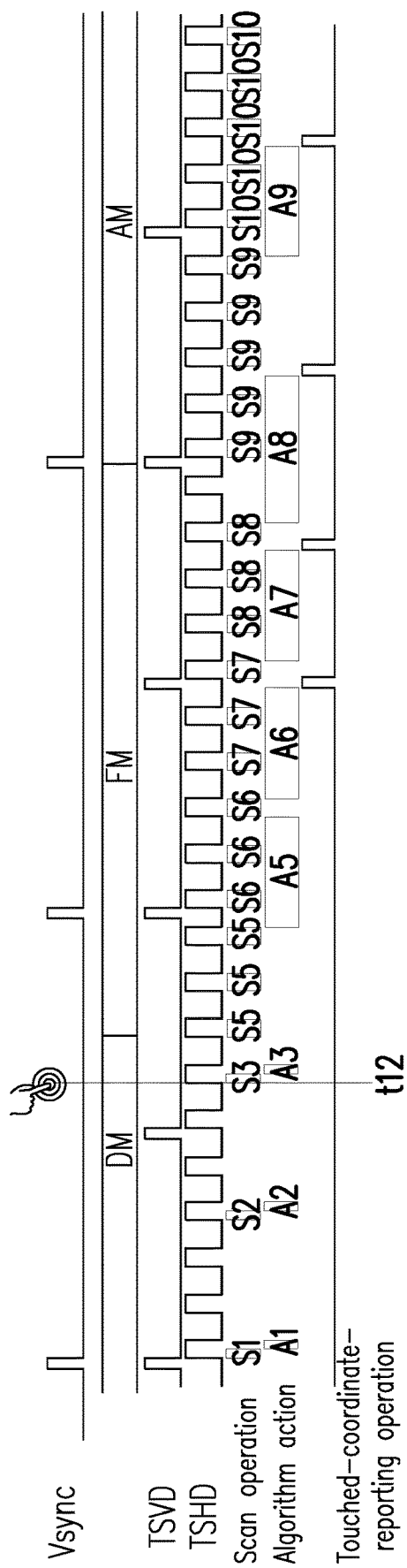
FIG. 12 is a timing diagram of a touch sensing operation according to an embodiment of the disclosure.

In the case that the fast touch scanning mode FM is in synchronization with the display frame synchronization signal, the touch display driving apparatus 130 may alternatively stay in the fast touch scanning mode FM longer, since the touch display driving apparatus 130 is able to detect and report the touch event in the fast touch scanning mode FM. FIG. 12 is a timing diagram of a touch sensing operation according to an embodiment of the disclosure. The embodiment shown in FIG. 12 can be deduced by referring to the related description of FIG. 3A and FIG. 11, so further details will not be repeated. Please refer to FIG. 1 and FIG. 12. In the embodiment shown in FIG. 12, the first touch event in the doze mode is assumed to occur at time t12, which is before the third doze-mode touch scan operation S3 is performed. The control circuit 132 can learn that the first touch event has occurred after the algorithm action A3 is completed, and in response, the touch display driving apparatus 130 ends the doze mode DM and enters the fast touch scanning mode FM. The touch display driving apparatus 130 does not need to perform the fourth doze-mode touch scan operation. Furthermore, as long as the start of the normal touch scanning mode AM is in synchronization with the display frame synchronization signal, the touch display driving apparatus 130 can keep staying in the fast touch scanning mode FM for one display frame period more, even though the next pulse of the display frame synchronization signal already comes.

According to different design requirements, the blocks of the timing generation circuit 131 and (or) the control circuit 132 may be implemented in the form of hardware, firmware, software (i.e., program), or a combination of multiple of the above three.

In terms of hardware, the blocks of the timing generation circuit 131 and (or) the control circuit 132 can be implemented in a logic circuit on an integrated circuit. The related functions of the timing generation circuit 131 and (or) the control circuit 132 can be implemented in the form of hardware by using hardware description languages (for example, Verilog HDL or VHDL) or other suitable programming languages. For example, the related functions of the timing generation circuit 131 and (or) the control circuit 132 may be implemented in one or more controllers, microcontrollers, microprocessors, application-specific integrated circuits (ASIC), digital signal processor (DSP), field programmable gate array (FPGA) and/or various logic blocks, modules and circuits in other processing units.

In terms of software and/or firmware, the related functions of the timing generation circuit 131 and (or) the control circuit 132 can be implemented as programming codes. For example, the timing generation circuit 131 and (or) the control circuit 132 can be implemented by using general programming languages (such as C, C++ or combined languages) or other suitable programming languages. The programming codes can be recorded/stored in a non-transitory recording medium. In some embodiments, the non-transitory recording medium, for example, includes a read only memory (ROM), a non-volatile random access memory (NVRAM), flash memory and (or) a storage device. The storage device includes a hard disk drive (HDD), a solid-state drive (SSD) or other storage devices. In other embodiments, the recording medium may include "non-transitory computer readable medium". For example, tape, disk, card, semiconductor memory, programmable logic circuit, etc. can be used to implement the non-transitory computer readable medium. A computer, a central processing unit (CPU), a controller, a microcontroller or a microprocessor can read and execute the programming codes from the recording medium to achieve the related functions of the timing generation circuit 131 and (or) the control circuit 132. Moreover, the programming codes can also be provided to the computer (or CPU) through any transmission medium (communication network, broadcast wave, etc.) The communication network is, for example, the Internet, wired communication, wireless communication or other communication media.

In summary, the touch display driving apparatus 130 and the operation method thereof described in the embodiments of the disclosure can configure the touch driving signal TX to scan the touch sensor array of the touch display panel 110 based on the normal scan rate (e.g., 120 Hz) in the normal touch scanning mode AM. In response to that the first touch event in the doze mode DM occurs, the touch display driving apparatus 130 ends the doze mode DM and enters the fast touch scanning mode FM. The control circuit 132 can configure the touch driving signal TX to scan the touch sensor array of the touch display panel 110 in the fast touch scanning mode FM based on a first scan rate (e.g., 180 Hz) immediately preceding the normal touch scanning mode AM. By using the fast touch scanning mode FM which has a touch scan rate higher than the normal touch scan rate in the normal touch scanning mode AM, the touch display driving apparatus 130 can shorten the first tap latency under the doze mode as much as possible.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A touch display driving apparatus, configured to drive a touch display panel, comprising:
   a touch sensing circuit configured to output a touch driving signal to a touch sensor array of the touch display panel, and receive a plurality of touch sensing signals from the touch sensor array, wherein the touch driving signal is configured to scan the touch sensor array at a normal scan rate in a normal touch scanning mode, and scan, in response to a touch event which is determined as occurring in a doze mode, the touch sensor array at a first scan rate in a fast touch scanning mode immediately preceding the normal touch scanning mode, wherein the first scan rate is greater than the normal scan rate, wherein the touch driving signal is further configured to scan the touch sensor array at a second scan rate in the doze mode to determine whether the touch event occurs, wherein the second scan rate in the doze mode is greater than the normal scan rate.

2. The touch display driving apparatus according to claim 1, wherein the second scan rate is greater than the first scan rate.

3. The touch display driving apparatus according to claim 1, wherein the touch driving signal comprises a first repetitive waveform corresponding to the first scan rate in the fast touch scanning mode and a normal repetitive waveform corresponding to the normal scan rate in the normal touch scanning mode, and wherein the first repetitive waveform is different from the normal repetitive waveform.

4. The touch display driving apparatus according to claim 3, wherein the touch driving signal further comprises a second repetitive waveform corresponding to the second scan rate in the doze mode, and wherein the second scan rate in the doze mode is greater than the normal scan rate and the second repetitive waveform is different from the normal repetitive waveform.

5. The touch display driving apparatus according to claim 1 further comprising:
   a control circuit, coupled to the touch sensing circuit to receive touch sensing information which is generated by the touch sensing circuit according to the plurality of touch sensing signals, and configured to generate a touch coordinate based on the touch sensing information.

6. The touch display driving apparatus according to claim 1, wherein the fast touch scanning mode lasts until a next pulse of a display frame synchronization signal.

7. An operation method of a touch display driving apparatus, comprising:
   outputting, by a touch sensing circuit, a touch driving signal to a touch sensor array of a touch display panel, wherein the touch driving signal is configured to scan the touch sensor array at a normal scan rate in a normal touch scanning mode, and scan, in response to a touch event which is determined as occurring in a doze mode, the touch sensor array at a first scan rate in a fast touch scanning mode immediately preceding the normal touch scanning mode, wherein the first scan rate is greater than the normal scan rate; and receiving, by the touch sensing circuit, a plurality of touch sensing signals from the touch sensor array, wherein the touch driving signal is further configured to scan the touch sensor array at a second scan rate in the doze mode to determine whether the touch event occurs, wherein the second scan rate in the doze mode is greater than the normal scan rate.

8. The operation method according to claim 7, wherein the second scan rate is greater than the first scan rate.

9. The operation method according to claim 7, wherein the touch driving signal comprises a first repetitive waveform corresponding to the first scan rate in the fast touch scanning mode and a normal repetitive waveform corresponding to the normal scan rate in the normal touch scanning mode, and wherein the first repetitive waveform is different from the normal repetitive waveform.

10. The operation method according to claim 9, wherein the touch driving signal further comprises a second repetitive waveform corresponding to the second scan rate in the doze mode, and wherein the second scan rate in the doze mode is greater than the normal scan rate and the second repetitive waveform is different from the normal repetitive waveform.

11. The operation method according to claim 7, further comprising:
   receiving, by a control circuit, touch sensing information from the touch sensing circuit, wherein the touch sensing information is generated by the touch sensing circuit according to the plurality of touch sensing signals, and generating, by the control circuit, a touch coordinate based on the touch sensing information.

12. The operation method according to claim 7, wherein the fast touch scanning mode lasts until a next pulse of a display frame synchronization signal.

* * * * *